United States Patent [19]

Miesterfeld et al.

[11] Patent Number: 4,742,349

[45] Date of Patent: May 3, 1988

[54] METHOD FOR BUFFERED SERIAL PERIPHERAL INTERFACE (SPI) IN A SERIAL DATA BUS

[75] Inventors: Frederick O. R. Miesterfeld, Troy; John M. McCambridge, Northville; Ronald E. Fassnacht, Rochester; Jerry M. Nasiadka, Warren, all of Mich.

[73] Assignee: Chrysler Motors Corporation, Highland Park, Mich.

[21] Appl. No.: 866,628

[22] Filed: May 22, 1986

[51] Int. Cl.[4] .............................................. H04Q 9/00
[52] U.S. Cl. .................................. 340/825.500; 370/85
[58] Field of Search ...................... 340/825.5, 825.51; 370/85

[56] References Cited

U.S. PATENT DOCUMENTS

| | | | |
|---|---|---|---|
| 4,281,380 | 7/1981 | Demesa et al. | 370/94 |
| 4,409,592 | 10/1983 | Hunt | 340/825.5 |
| 4,429,384 | 1/1984 | Kaplinsky | 370/85 |
| 4,434,421 | 2/1984 | Baker et al. | 340/825.51 |
| 4,470,110 | 9/1984 | Chiarottino et al. | 370/85 |
| 4,472,712 | 9/1984 | Ault et al. | 340/825.5 |
| 4,628,311 | 12/1986 | Milling | 340/825.5 |

OTHER PUBLICATIONS

A. Bozzini, et al., "Serial Bus Structures for Automotive Applications", SAE Technical Paper Series, 830536, Feb. 28–Mar. 4, 1983.

F. Miesterfeld, "Chrysler Collision Detection ($C^2D$)-A Revolutionary Vehicle Network", SAE Technical Paper Series, 860389, Feb. 24–28, 1986.

F. Phail, et al., "In Vehicle Networking-Serial Communication Requirements And Directions", SAE Technical Paper Series, 860390, Feb. 24–28, 1986.

R. Mitchell, "A Small Area Network For Cars", 840317, Sae Technical Paper Series.

SAE Information Report, "J 1567 Collision Detection Serial Data Communications Multiplex Bus", May 23, 1986.

IEEE Paper No. CH2072-7/84/0000-0083, "A Data Link For Agricultural and Off Highway Communications", 1984, Boyd Nichols, et al.

Primary Examiner—Donald J. Yusko
Attorney, Agent, or Firm—Mark P. Calcaterra

[57] ABSTRACT

In a communication system for the transmission of messages through a data bus between one or more user microprocessors coupled to the data bus, the user microprocessors having either a serial communications interface (SCI) port or a serial peripheral interface (SPI) port along with a clock port and an input/output port, the user microprocessors being coupled to the data bus by a bus interface integrated circuit, a method to transmit and receive data in a buffered serial peripheral interface (SPI) mode of operation in conjunction with a method of arbitrating data on the data bus.

2 Claims, 5 Drawing Sheets

Buffered SPI

Buffered SPI

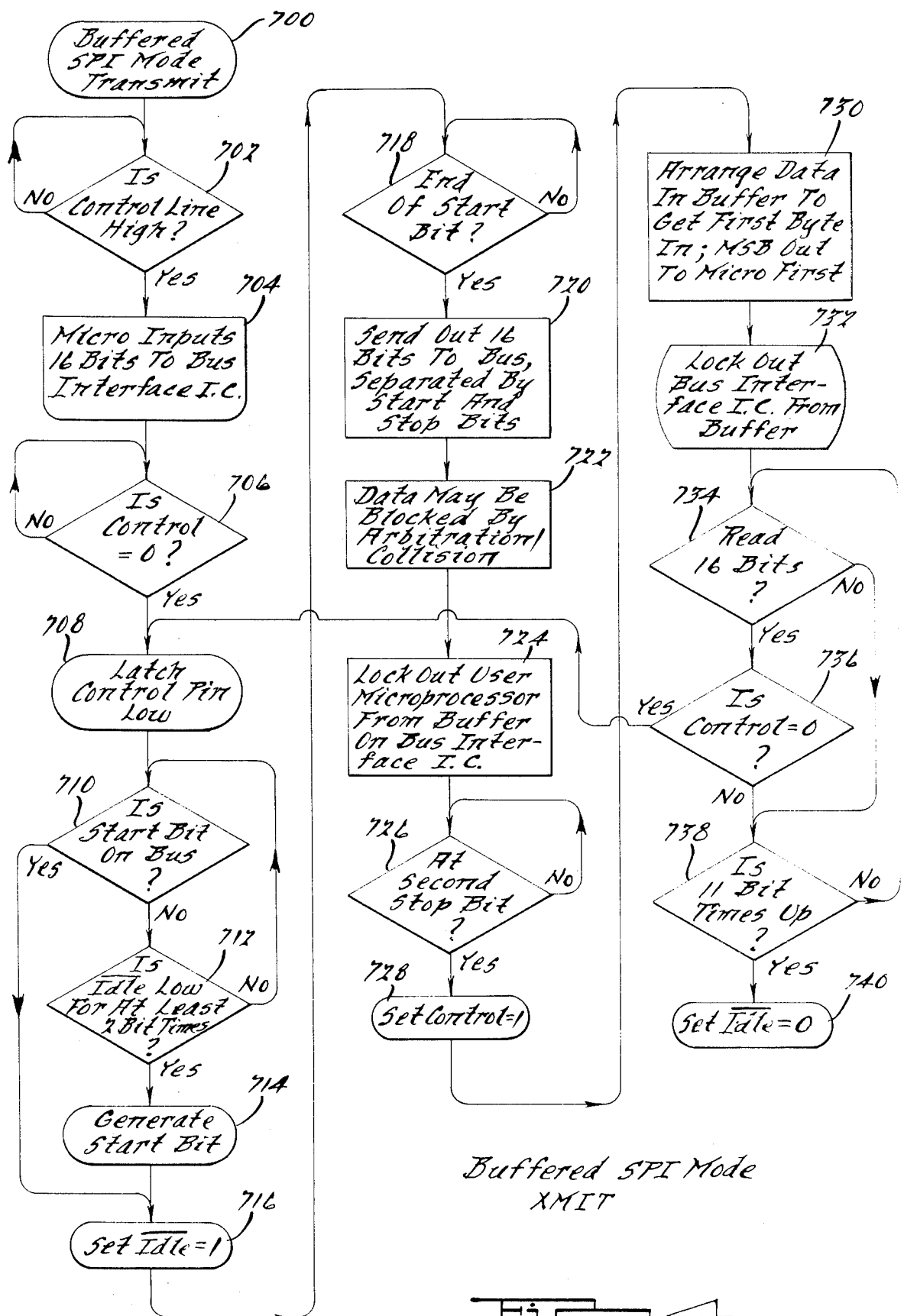

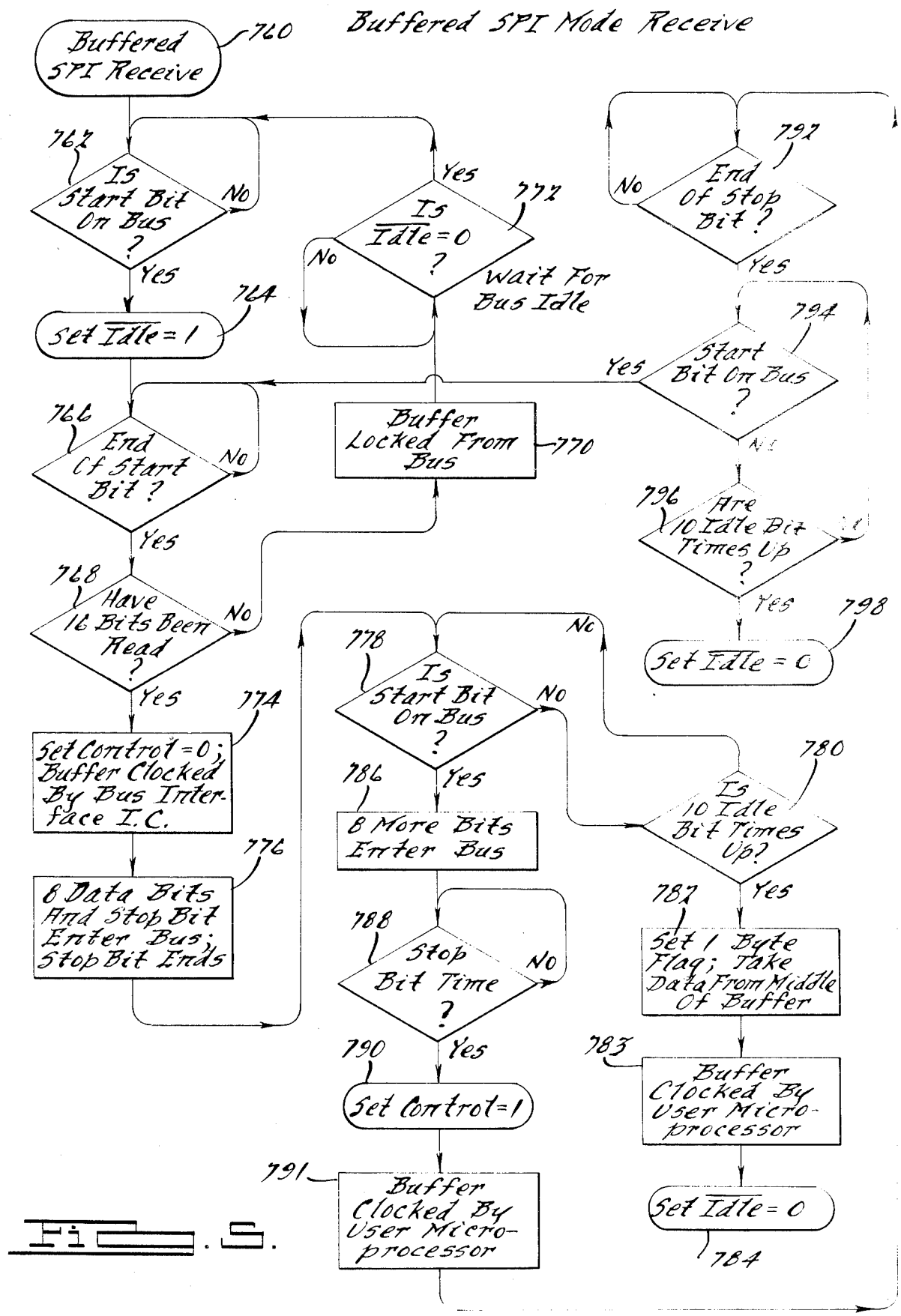

METHOD FOR BUFFERED SERIAL PERIPHERAL INTERFACE (SPI) IN A SERIAL DATA BUS

BACKGROUND OF THE INVENTION

1. Field of the Invention

The purpose of the disclosed method for buffered serial peripheral interface in a serial data bus is to provide a method of handling a buffered SPI port as part of the serial data bus interface IC circuit described herein.

2. Description of the Prior Art

Data communications between microprocessors or microcomputers need to communicate with each other in many applications.

Local area networks (LAN) link such microprocessors or microcomputers, allowing one of the microcomputers to seize control of the serial data channel commonly linked to all other microprocessors on the LAN and transmit data to any other unit. The protocols, controllers and software needed in a LAN are very complex, especially in large systems.

An automotive environment is a smaller application and, thus, does not require the complex performance capabilities available in a LAN.

Digital data buses have been designed to handle the above-described data communications link in a small area. Such a system is described in SAE Paper No. 840317, by Ronald L. Mitchell entitled "A Small Area Network For Cars." This document is hereby expressly incorporated by reference. Also descriptive of such a digital data bus is U.S. Pat. No. 4,429,384 to Kaplinsky entitled "Communication System Having An Information Bus And Circuits Therefor."

Also descriptive of developments in this field is SAE Paper No. 860390 by Frederick H. Phail and David J. Arnett entitled "In Vehicle Networking—Serial Communications Requirements and Directions." This document is also hereby expressly incorporated by reference.

The subject invention differs from the art noted above by use of a constant speed, the lack of use of an acknowledgement bit and the lack of requirements for a tight link between the transmitting station and the receiving stations. Also important in the subject invention is the communication link between the message transmitter and receiver.

Generally, the following U.S. patents discuss collision detection in data communications systems: U.S. Pat. No. 4,281,380 of DeMesa III et al. entitled "Bus Collision Avoidance System For Distributed Network Data Processing Communications System" dated July 28, 1981; U.S. Pat. No, 4,409,592 of V. Bruce Hunt entitled "Multipoint Packet Data Communication System Using Random Access And Collision Detection Techniques" dated Oct. 11, 1983; U.S. Pat. No. 4,434,421 of Baker et al. entitled "Method For Digital Data Transmission With Bit-Echoed Arbitration" dated Feb. 28, 1984; U.S. Pat. No. 4,470,110 of Chiarottino et al. entitled "System For Distributed Priority Arbitration Among Several Processing Units Competing For Access To A Common Data Channel" dated Sept. 4, 1984; and U.S. Pat. No, 4,472,712 of Ault et al. entitled "Multipoint Data Communication System With Local Arbitration" dated Sept. 18, 1984.

The U.S. Pat. No. 4,434,421 patent to Baker et al. deals with a method to reduce the number of collisions. This is done by reducing the number of slave stations attempting bus access until there is one master and one slave station in communication. This differs from the subject invention in that a broadcast method is employed whereby several uses can receive the same message.

The U.S. Pat. No. 4,470,110 to Chiarottino et al. discloses a system to exchange messages including an interface. In addition, the U.S. Pat. No. 4,470,110 assigns a priority to an address bit of a particular logical level.

Also of interest is an article in an IEEE publication "Automotive Applications of Microprocesors," 1984; Paper No. CH2072-7/84/0000-0083 entitled "A Data Link For Agricultural And Off Highway Communications" by Boyd Nichols, Vijay Dharia and Kanaparty Rao.

Of paramount importance in the subject invention is the inclusion of the capability to communicate with a serial communication interface (SCI) port, a serial peripheral interface (SPI) port and a buffered serial peripheral interface (BSPI) port.

SUMMARY OF THE INVENTION

The purpose of the serial data bus system disclosed herein, also known as Chrysler Collision Detection ($C^2D$) bus, is to allow multiple microprocessors to easily communicate with each other over a common pair of wires or bus using a scheme similar to a telephone party line. All microprocessors connected to the bus are able to receive all messages transmitted on the bus. Any microprocessor with a message to transmit on the bus waits until any current user is finished before attempting to use it.

Whenever the bus is available, its use is allocated on a first-come first-serve basis. That is, whichever microprocessor begins transmitting its message on the bus, after any previous message finishes, gets the use of the bus. If, however, multiple microprocessors attempt to begin transmitting their messages on the bus at exactly the same time, then the message with the highest priority wins the use of the bus. All messages have unique message priority values and each message is transmitted by only one microprocessor.

The invention disclosed herein is further summarized in two co-pending patent applications on related material. Both applications were filed in the U.S. Patent & Trademark Office on Feb. 24, 1986, and are commonly owned with the subject patent application. They are: "Serial Data Bus For Intermodule Data Communications," U.S. Ser. No. 832,908; and "Method Of Data Arbitration and Collision Detection On A Data Bus," U.S. Ser. No. 832,909. Both of these applications are hereby expressly incorporated by reference.

Also hereby incorporated by reference is SAE Information Report entitled "J1567 Collision Detection Serial Data Communications Multiplex Bus" to be presented to the SAE Multiplexing Committee on May 23, 1986.

Attention is invited to the above-described applications for further explanation of the summaries of some of the basics of the invention described in the subject application.

It is an object of the subject invention to provide an SCI port, an SPI port and a buffered SPI port as part of the serial data interface integrated circuit described herein. This allows communication with any device configured with any one of these three ports all on the same bus. The inclusion of the ports augments the simplification of the serial data communication described in the previously filed patent applications on the related subject matter.

DESCRIPTION OF THE DRAWINGS

Other objects, features and advantages of the present invention will become more fully apparent from the detailed description of the preferred embodiment, the appended claims and the accompanying drawings in which:

FIG. 3 illustrates in block diagram form the hardware used in the buffered SPI mode of a serial data bus interface IC;

FIG. 4 is a flowchart showing the buffered SPI mode methods under a transmit condition; and FIG. 5 shows the flowchart of the SPI mode in a receive condition.

DETAILED DESCRIPTION OF THE PREFERRED EMBODIMENT

This application is one of three filed on the same day and having related specifications and drawings. The other cases are commonly owned with the same inventors and are Ser. No. 866629 entitled "Serial Data Bus For SCI, SPI And Buffered SPI Modes Of Operation" and Ser. No. 866630 "Method For Serial Peripheral Interface In A Serial Data Bus." Both of these cases are hereby expressly incorporated by reference.

Further documents hereby expressly incorporated by reference include U.S. Pat. No.4,429,384 issued to Kaplinsky and entitled "Communication System Having An Information Bus And Circuits Therefor"; SAE Technical Paper No. 830536 entitled "Serial Bus Structures For Automotive Applications" by Anthony J. Bozzini and Alex Goldberger dated Feb. 28, 1983; SAE Paper No. 840317 by Ronald L. Mitchell entitled "A Small Area Network For Cars"; SAE Paper No. 860390 by Frederick H. Phail and David J. Arnett entitled "In-Vehicle Networking—Serial Data Communication Requirements And Directions"; and SAE Paper No. 860389 by Frederick O. R. Miesterfeld entitled "Chrysler Collision Detection ($C^2D$) A Revolutionary Vehicle Network."

Figure 1:
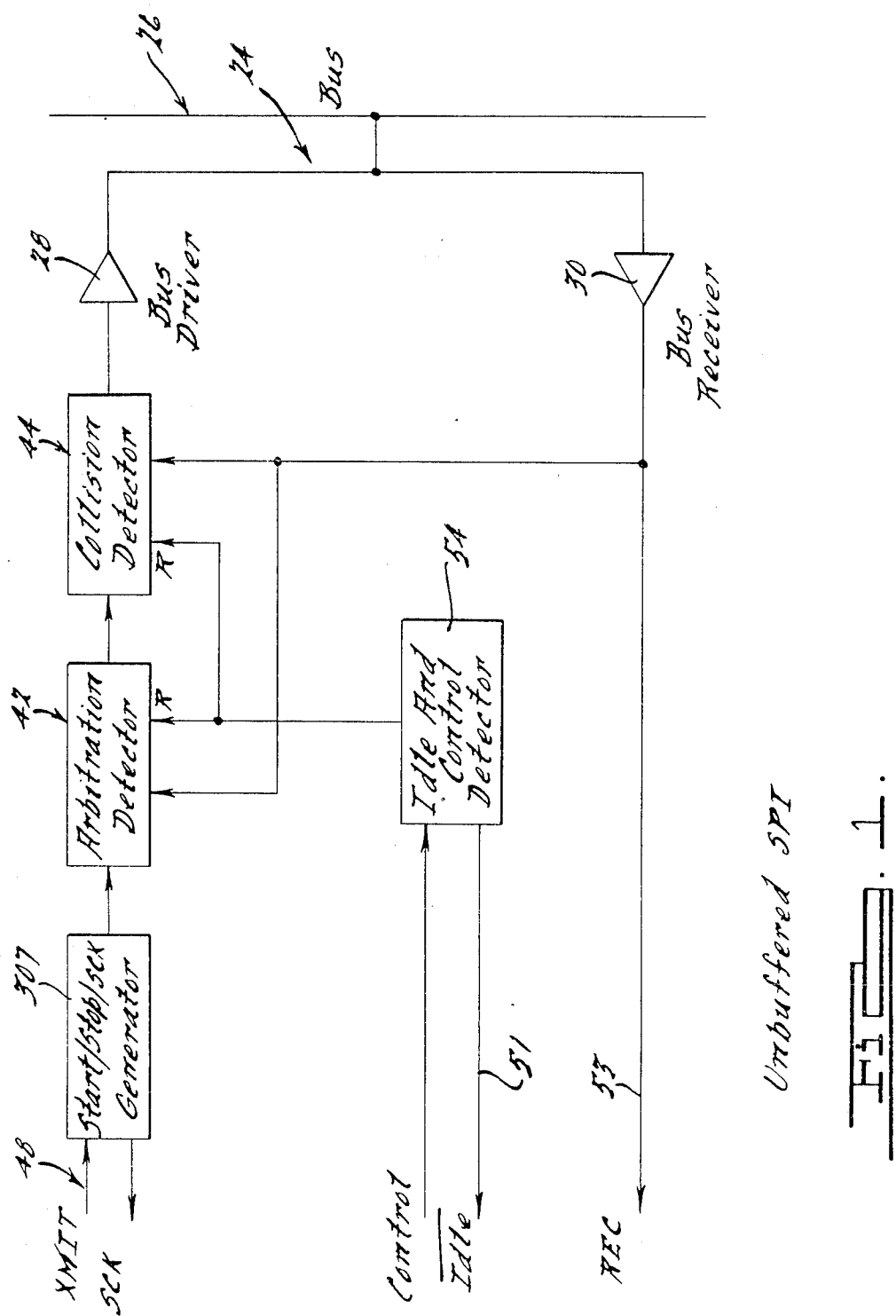
FIG. 1 illustrates in block diagram form, the hardware used in the SPI mode of a serial data bus interface integrated circuit (IC)
Figure 2:
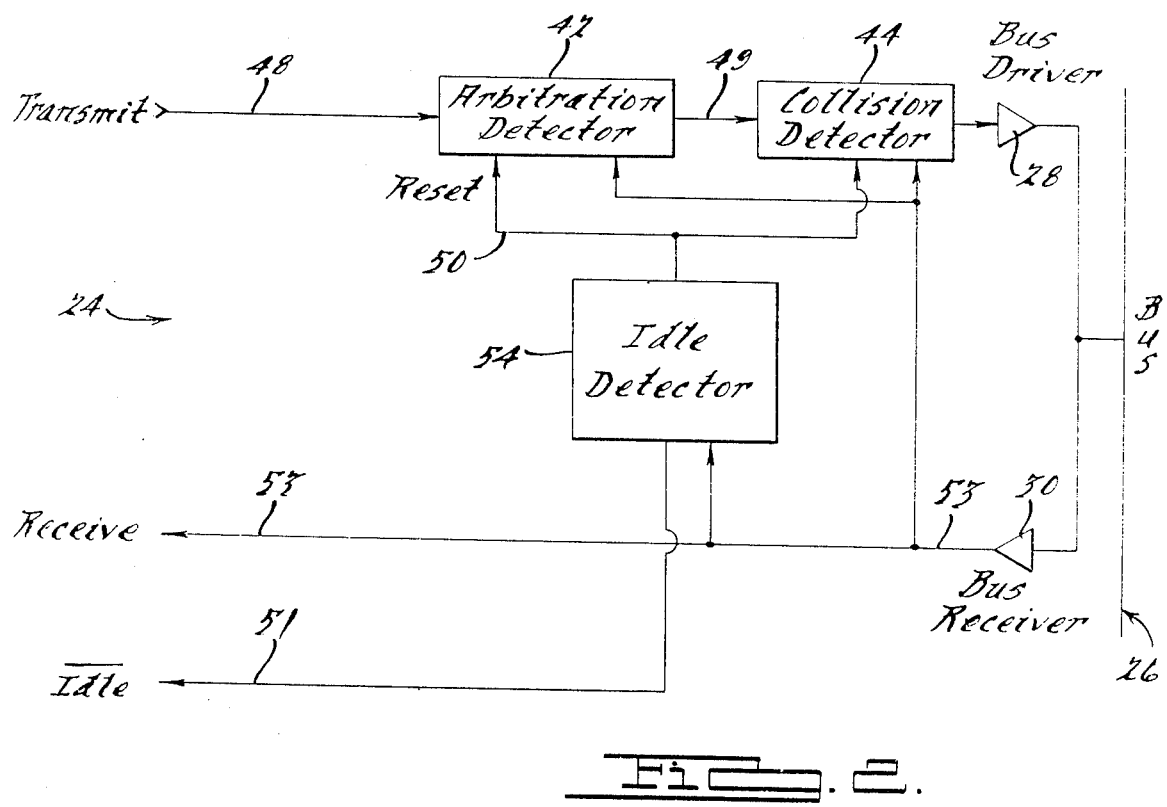
FIG. 2 illustrates another block diagram showing the serial data bus in an SCI mode.
Figure 2:
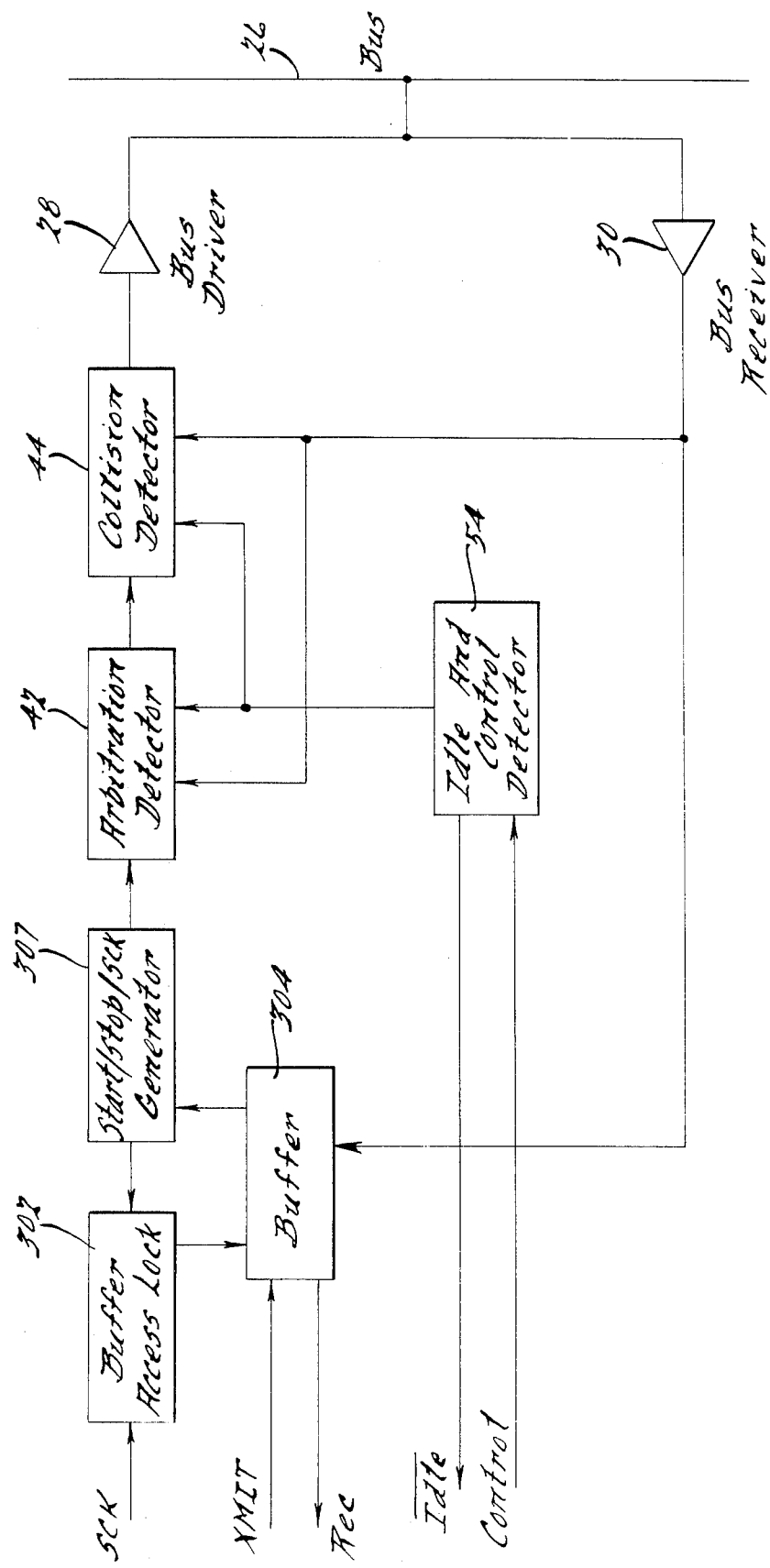

Attention is invited to the previously filed patent applications and the concurrently filed patent applications on the related subject matters for a more complete description of some of the hardware disclosed in FIG. 1 and FIG. 2.

The interaction between the arbitration detector 42, collision detector 44, word counter 202, word flip-flop 203, start bit detector 200, framing error detector 204, idle counter 206, idle flip-flop 207, clock divider 201, digital filter 210, bus driver made up of OR gate 62 and NAND gate 63, along with bus receiver 30 in conjunction with current source 34 and current sink 36 as connected to the bus 26.

An understanding of the above-listed blocks is necessary for understanding the improvements outlined in the subject application. Attention is, therefore, invited to patent applications U.S. Ser. No. 843,908 and 843,909 and the explanations included therein and the drawings which all have been incorporated by reference.

Referring to FIG. 1 and FIG. 2, the hardware of the serial data bus interface IC 24 is shown in two ways. In FIG. 2, the bus interface IC 24 is shown in a serial communications interface (SCI) mode. That is, only the hardware which is used exclusively for SCI and which is common to other modes of operation for the serial data bus, namely SPI and buffered SPI is illustrated.

FIG. 1 augments the diagram of FIG. 2 by adding in the hardware from the bus interface IC 24 which is used in an SPI mode (in an unbuffered condition).

The block diagram in FIG. 2 is adequately described in the documents incorporated by reference and should not be repeated here.

The unbuffered SPI hardware diagram shown in FIG. 1 merely augments the diagram of FIG. 2 with some of the blocks and lines described in other co-pending patent applications, namely, the start/stop/SCK generator 307 and the SCK and CONTROL lines. Also augmented in this figure is the idle control detector 54 to show that the idle and control detector is comprised of the idle counter 206, idle flip-flop 207 and the scheduler and controller block 309, all described in the co-pending patent application entitled "Serial Data Bus For SCI, SPI and Buffered SPI Modes of Operation."

The buffered SPI hardware diagram shown in FIG. 3 further augments the diagrams in FIG. 1 and FIG. 2 with some of the blocks and lines described in other copending patent applications, namely the buffer access lock 302 which is also referred to as an SCK selector, and the buffer 304 which is also referred to as a 16-bit buffer and bit reverser. Also of note is the use of the transmit receive lines as presented to and from the buffer 304.

Further descriptions of the interactions of these components is described in the co-pending patent application entitled "Serial Data Bus for SCI, SPI And Buffered SPI Modes of Operation" which has been incorporated by reference and the explanations will not be repeated here.

Turning now to FIG. 4 and FIG. 5, the buffered SPI method will be described in its transmit and receive conditions. This is the heart of the subject invention.

When the buffered SPI mode, under a transmit condition, is entered in block 700, it looks at the CONTROL line in block 702 to see when it goes to a high level.

Once the CONTROL line goes to a high level, the user microprocessor (which is not shown in the present patent application, but which is illustrated in the previously filed and concurrently filed patent applications, all incorporated by reference as user microprocessor 22) inputs 16 bits onto the bus interface IC 24 in block 704.

Next, the method calls for the checking of the CONTROL line in block 706 to see when it falls to a low level. Once the CONTROL line does fall to a low level, the method falls through to block 708 to latch the control pin in a low condition and check to see whether the start bit is on the bus 26 in block 710. If the start bit is not on the bus 26, then the method falls through to block 712 to check the $\overline{IDLE}$ line to see if it has been low for at least two bit times. If it has not, the method returns to block 710 to recheck to see whether the start bit is on the bus 26 in block 710.

If the $\overline{IDLE}$ line is low for at least two bit times, the methods falls through to block 714 to generate a start bit, then to set the $\overline{IDLE}$ condition to a logical one level in block 716.

Returning to decision block 710, if the start bit is on the data bus 26, the method immediately branches to block 716 to set the $\overline{\text{IDLE}}$ condition to a logical one.

Next, the method falls through to block 718 to check for the end of the start bit and waits until this occurs before falling through to block 720 to send out 16 bits of data to the bus 26 separated by start and stop bits. Simultaneously, in block 722, the data may be blocked by the arbitration detector 42 and collision detector 44. The user microprocessor 22 is then locked out from the buffer 304 of the bus interface IC 24 in block 724.

Once the second stop bit has occurred as checked in block 726, the method calls for the setting of the CONTROL line to a logical one in block 728 before arranging the data in the buffer 304 to get the first byte transmitted in block 730 with the most significant bit out first to the microprocessor.

The bus interface IC 24 is then locked out from the buffer 304 in block 732.

Decision block 734 calls for the reading of 16 bits. If 16 bits have been read, then the bus interface IC checks to see if the CONTROL line is at a logical zero level in block 736. If it is, the bus interface IC returns to block 708 to latch the CONTROL pin low and follows the procedure following block 708.

If the control line is not equal to a logical zero as checked in block 736, the bus interface IC 24 falls through to block 738 to check to see whether 11 bit times has occurred. If not, the bus interface IC 24 returns to block 734 to check again as to whether 16 bits have been read. If the 11 bit times are up, the transmit condition in the buffered SPI mode terminates after setting the $\overline{\text{IDLE}}$ line to a logical zero in block 740.

Returning to block 734, if 16 bits have not been read, the method branches immediately to block 738 to check the occurrence of 11 bit times and follows the rest of the procedure from there.

Concentrating now on FIG. 5, the buffered SPI mode in the receive condition is illustrated beginning in block 760 and is followed by the decision block in 762 where the condition of the start bit is watched for on the bus 26. Once the start bit appears on the bus 26, the bus interface IC 24 falls through to block 764 to set the $\overline{\text{IDLE}}$ to a logical one before checking for the end of the start bit in 766. The bus interface IC waits for the end of the start bit before falling through to the rest of the routine.

Next, the bus interface IC 24 approaches the decision block 768 to check to see whether 16 bits have been read. If not, the buffer 304 is locked from access to the bus 26 in block 770 and the bus interface IC waits for a bus idle condition to occur by checking the $\overline{\text{IDLE}}$ line in block 772 and waiting for it to fall to a logical low level before branching to the already described decision block and following steps in block 762 to recheck the data bus to see whether a start bit appears thereon.

Returning now to decision block 768, if 16 bits have been read, the bus interface IC 24 falls through to block 774 to set the CONTROL line to a low level and to clock the buffer 304. Next, in block 776, eight data bits and stop bit enter the bus 26. Following the end of the stop bit, the bus interface IC rechecks to see whether a start bit has appeared on the data bus 26 in block 778. If not, the bus interface IC checks to see whether 10 idle bit times have occurred in block 780, then returning to recheck the occurrence of a start bit on the bus 26 in block 778 if 10 idle bit times have not occurred.

If 10 idle bit times have been counted, a byte flag is set before taking data from the middle of the buffer 304 in block 782. Next, the $\overline{\text{IDLE}}$ line is set to a logical low level in block 784 after the buffer 304 is clocked by user microprocessor 22 in 783.

Returning to block 778, is the start bit appears on the bus 26, then 8 more bits are allowed to enter the bus 26 in block 786. In block 788, the bus interface IC 24 checks for the stop bit time and waits for this to occur before falling through to block 790 to set the CONTROL line to a logical one condition before the buffer 304 is clocked by the user microprocessor 22 in block 791.

The end of the stop bit is watched in block 792 and once it occurs, the bus interface IC falls through to block 794 to check whether a start bit has appeared on the bus 26. If so, the bus interface IC returns or branches to the previously described method beginning in block 766 and follows the procedure already described from there.

Returning to block 794, if the start bit does not appear on the bus 26, the bus interface IC 24 falls through to check for the occurrence of 10 idle bit times in block 796, returning to recheck for the occurrence of a start bit on the data bus 26 in block 794 if 10 idle bits have not occurred.

Once 10 idle bit times have been clocked in block 796, the bus interface IC 24 falls through to block 798 to set the $\overline{\text{IDLE}}$ line to a low condition.

Note that when the CONTROL line is at a high level, the buffer 304 is full and when at a low level, the buffer 304 is being filled.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

We claim:

1. In a communication system for the transmission of messages through a data bus between one or more user microprocessors coupled to the data bus, the user microprocessors having either a serial communication interface (SCI) port or a serial peripheral interface (SPI) port along with a clock port and a input/output port, the user microprocessors being coupled to the data bus by a bus interface integrated circuit with a control line, an idle line and a buffer, a method of transmitting data in a buffered SPI mode of operation comprising:

a bit-wise contention and a deterministic priority access method to (a) resolve contentions among user microprocessors that try to send messages at the same time and to (b) synchronize each data byte and to (c) allow the priority of an ID byte of the message to determine which of a plurality of messages will be sent first in the case of a contention, the determination of which user microprocessor transmits first being made without losing bus time when contention occurs; and checking to see whether another user microprocessor with higher priority is already transmitting on the data bus by reading the state of the control line, waiting if such is the case;

if no other user microprocessor is already transmitting on the data bus, loading data into the buffer on the bus interface IC;

signaling the data bus that transmission is about to occur by latching the state of the control line to a predetermined state;

checking to see whether a start bit is already on the data bus, waiting at least 2 idle bit times if no start bit is on the data bus before generating a start bit;

sending a signal to the data bus by setting the idle time for predetermined state indicating that the bus is busy;

waiting for the end of the start bit to occur;

sending out two bytes of data to the bus from the buffer separated by bus interface IC-generated start and stop bits if not blocked by the bitwise contention and deterministic priority access method in the bus interface IC;

locking out the user microprocessor from the buffer on the bus interface integrated circuit;

waiting for the second stop bit to occur;

arranging data in the buffer to get the first byte in, such that the most significant byte out to the user microprocessor will be sent first;

locking out data on the bus via the bus interface integrated circuit from the buffer;

waiting for the reading of the data;

repeating the previous steps if more data is to be transmitted;

waiting 11 bit times if the data transmission is complete; and releasing the bus to an idle condition.

2. In a communication system for the transmission of messages through a data bus between one or more user microprocessor coupled to the data bus, the user microprocessors having either a serial communications interface (SCI) port or a serial peripheral interface (SPI) port along with a clock port and an input/output port, the user microprocessors being coupled to the data bus by a bus interface integrated circuit, with a control line, an idle line and a buffer a method of receiving data in a buffered SPI mode of operation comprising:

a bit-wise contention and a deterministic priority access method to (a) resolve contentions among user microprocessors that try to send messages at the same time and to (b) synchronize each data byte and to (c) allow the priority of an ID byte of the message to determine which of a plurality of messages will be sent first in the case of a contention, the determination of which user microprocessor transmits first being made without losing bus time when contention occurs; and waiting for a start bit to appear on the data bus;

signaling other user microprocessors that the data bus is busy;

waiting for the end of the start bit to occur;

waiting for the data to be read, locking the buffer from the bus if the data has not been read and waiting for the bus to return to an idle state before rechecking to see whether a start bit has appeared on the data bus;

if all of the data has been read into the buffer, clock the buffer;

allow data and stop bit to enter the data bus;

allowing the user microprocessor to clock the buffer;

waiting for the end of the stop bit;

waiting for the occurrence of the start bit on the data bus before reading the rest of the data from the bus, but releasing the data bus to an idle condition if ten idle bit times follow the first entry of data;

waiting for the stop bit time to occur and waiting for the end of the stop bit;

checking to see whether a start bit has appeared on the bus and repeating the above procedures if more transmission is to occur;

waiting for ten idle bit times if a start bit is not on the bus and signaling the rest of the user microprocessors that the bus is in an idle condition.

* * * * *